United States Patent [19]
Bullock et al.

[11] Patent Number: 5,170,609
[45] Date of Patent: Dec. 15, 1992

[54] FLUIDIC DEFLATOR MEANS AND METHOD FOR ARTICLE PACKAGING

[75] Inventors: Larry J. Bullock, Lancaster, Pa.; Malcolm E. Taylor, Pelham, N.H.; Stephen C. Jens, Ashland, Mass.

[73] Assignee: Hershey Foods Corporation, Hershey, Pa.

[21] Appl. No.: 644,034

[22] Filed: Jan. 22, 1991

[51] Int. Cl.$^5$ .................. B65B 9/20; B65B 31/00; B65B 55/00; B65B 61/24
[52] U.S. Cl. ........................... 53/434; 53/451; 53/511; 53/512; 53/551
[58] Field of Search .............. 53/511, 512, 433, 434, 53/451, 551, 552

[56] References Cited

U.S. PATENT DOCUMENTS

| | | |
|---|---|---|
| 1,980,022 | 11/1934 | Whitehouse . |
| 2,113,636 | 4/1938 | Vogt ........................... 53/511 X |
| 2,145,941 | 2/1939 | Maxfield . |
| 3,010,265 | 11/1961 | McClosky .................... 53/511 |
| 3,027,695 | 4/1962 | Leasure ....................... 53/451 |
| 3,040,490 | 6/1962 | Virta . |
| 3,471,990 | 10/1969 | Bonuchi et al. ............. 53/434 |
| 3,482,373 | 12/1969 | Morris ......................... 53/511 |
| 3,518,809 | 7/1970 | Ott ............................... 53/511 |
| 3,545,983 | 12/1970 | Woods ......................... 53/451 X |
| 3,634,993 | 1/1972 | Pasco et al. . |
| 3,738,080 | 6/1973 | Reil ............................. 53/551 |
| 3,759,722 | 9/1973 | Simon ......................... 53/434 X |
| 3,811,245 | 5/1974 | Mosterd ...................... 53/526 X |
| 3,849,965 | 11/1974 | Dominici ..................... 53/451 |
| 3,859,775 | 1/1975 | Kihnke . |
| 3,886,713 | 6/1975 | Mitchell et al. ............. 53/436 |
| 4,073,121 | 2/1978 | Greenwalt et al. .......... 53/511 |
| 4,215,520 | 8/1980 | Heinzer et al. .............. 53/552 X |
| 4,215,524 | 8/1980 | Saylor . |
| 4,418,514 | 12/1983 | Spann . |
| 4,457,122 | 7/1984 | Atkins et al. ................ 53/512 X |
| 4,563,862 | 1/1986 | McElvy . |
| 4,633,654 | 1/1987 | Sato et al. ................... 53/551 X |
| 4,676,051 | 6/1987 | Hoskinson et al. ......... 53/451 |
| 4,697,403 | 10/1987 | Simpson et al. . |
| 4,706,441 | 11/1987 | Chervalier .................. 53/512 |
| 4,769,974 | 9/1988 | Davis . |
| 4,964,259 | 10/1990 | Ylvisaker et al. ........... 53/511 X |

FOREIGN PATENT DOCUMENTS

2051093  4/1972  Fed. Rep. of Germany ........ 53/512

*Primary Examiner*—Horace M. Culver
*Attorney, Agent, or Firm*—Paul & Paul

[57] ABSTRACT

The present invention provides a novel deflator means for expelling excess air from packages which is used in connection with form, fill and seal packaging machines, said deflator means comprising flexible walled, fluid-filled bladder means which engages a product-containing bag and forces excess air out from the bag, the bladder fluid also being provided to be in communication with a reservoir which permits fluid exchange between the bladder, and the reservoir during the packaging cycle.

33 Claims, 3 Drawing Sheets

FLUIDIC DEFLATOR MEANS AND METHOD FOR ARTICLE PACKAGING

BACKGROUND OF THE INVENTION

This invention relates to an apparatus and method for bag making, filling, and sealing, which removes entrained air from a filled or partially filled bag.

In applications where it is necessary to package a quantity of articles within a sealed bag, vertical form, fill and seal bagging machines are well known and widely employed in the art. An example of such a machine is disclosed in U.S. Pat. No. 4,697,403 to Simpson et al. Packaging of this nature usually involves dispensing the product material into a bag and thereafter sealing the bag. If not extracted before the sealing process is complete, undesirable quantities of air will remain within the bag after it has been sealed. The excess air which remains in the package after sealing is often problematic, and can occupy a substantial portion of the volume of the shipping case in which the bags are transported. During the course of shipping, the excess air may bleed out of the filled bags, thereby creating an unoccupied volume within the shipping case. When this occurs the bags containing product articles are no longer supported as well by the case, and are therefore free to move about, the result of which is often damage to the articles. In addition to minimizing product damage, the removal of excess air from a package prior to sealing greatly facilitates the number of product bags which can occupy the shipping case volume.

The prior art has attempted to deal with the removal of excess air from packages largely by providing a vacuum means for withdrawing air from a package, such as is disclosed in U.S. Pat. No. 3,545,983 issued to Q. T. Woods. The Woods patent discloses a vacuum chamber in combination with shaping plates for reducing the oxygen content of a package prior to sealing. Often the high speed with which today's packaging machines operate does not make withdrawal of air by known vacuum methods feasible, since such methods require that tubes be inserted into the package or that the package be enclosed within a chamber prior to sealing.

Other attempts by bagging machine manufacturers to provide a means for expelling air from packages by using foam or spring deflators have been used, such as, for example, U.S. Pat. No. 3,471,990 to J. A. Bonuchi et al. which discloses the use of a foam member to compress a package in order to remove excess air. Foam, however, is often susceptible to compressing or freying within a short period of use, thereby necessitating that production be interrupted in order to change the foam. Another Patent, U.S. Pat. No. 4,633,654, teaches placing each package in a sealed environment in order to remove the excess air therefrom. Aside from it being more difficult to maintain a sealed environment, such can also be costly.

The present invention provides a novel form, fill and packaging machine which will expel air from a package before sealing, while alleviating problems encountered by prior methods and apparatus.

SUMMARY OF THE INVENTION

The present invention provides a fluidic deflator means and method for article packaging, wherein excess air is expelled from an article-containing package during serially continuous bag making, filling and sealing operations.

It is a primary object of the invention to provide a novel method and apparatus for removing excess air from a package during bag-making, filling and sealing operations.

It is another object of the present invention to provide an apparatus and method for removing excess air from a package whereby product articles contained within the bag are not damaged.

It is a further object of the present invention to accomplish the above objects by providing fluidic deflator means to remove excess air from a package by engagement with the package.

Another object of the present invention is to provide fluidic deflator means for removing excess air, whereby the deflator means are adjustable to accommodate a variety of bag sizes and volumes.

It is an additional object of the present invention to provide a regulation means for controlling the pressure exerted on a bag by the fluidic deflator means.

These and other objects and advantages of the present invention will be readily apparent to those skilled in the art by reading the following brief description of the drawings, detailed description of the preferred embodiments and the appended claims.

DETAILED DESCRIPTION OF THE PREFERRED EMBODIMENTS

Figure 1:
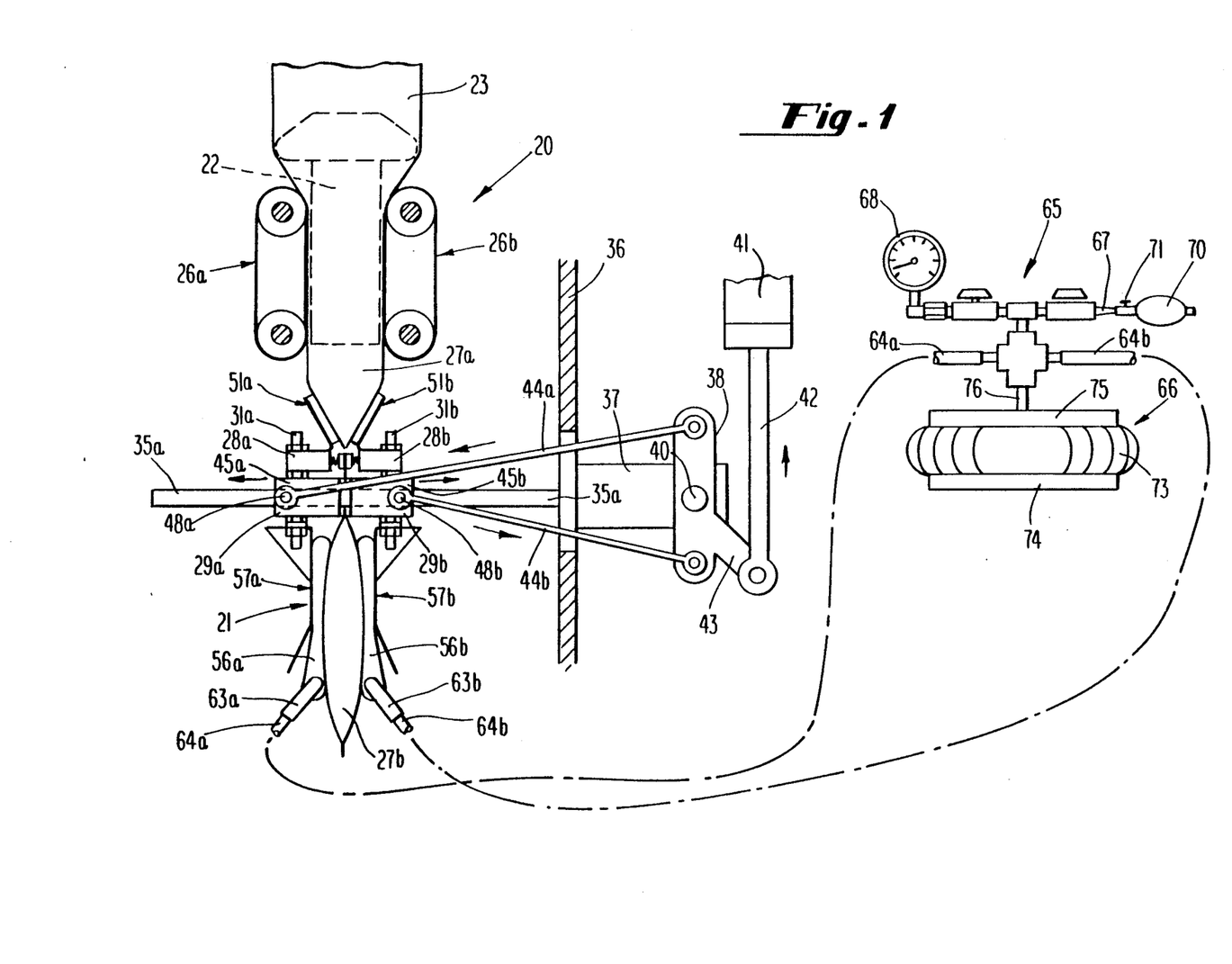
FIG. 1 shows an elevational end view of the fluidic deflator mechanism employed with a vertical form, fill and seal bagging machine.

Referring to FIG. 1, a packaging machine 20 is shown, in part, with fluidic deflator mechanism 21 in use therewith. The packaging machine 20, for example, may comprise any of the types commonly referred to as a vertical form, fill and seal, bagging machine. Alternatively, the fluidic deflator mechanism 21 may be employed with packaging apparatus, other than that specifically mentioned herein.

The bagging machine 20 is shown comprising a hollow tube member 22 about which is disposed a sheet of packaging film 23 which is advanced over the tube 22 by a pair of belt conveyors 26a, 26b disposed on opposite sides of said tube 22. A longitudinal sealing device (not shown) is provided at the upper end of the tube for longitudinally joining the ends of said packaging film 23 to form a package blank 27a. The conveyors 26a, 26b engage the packaging film 23 and advance it over the tube 22 at intermittent intervals of a bag length.

Figure 2:
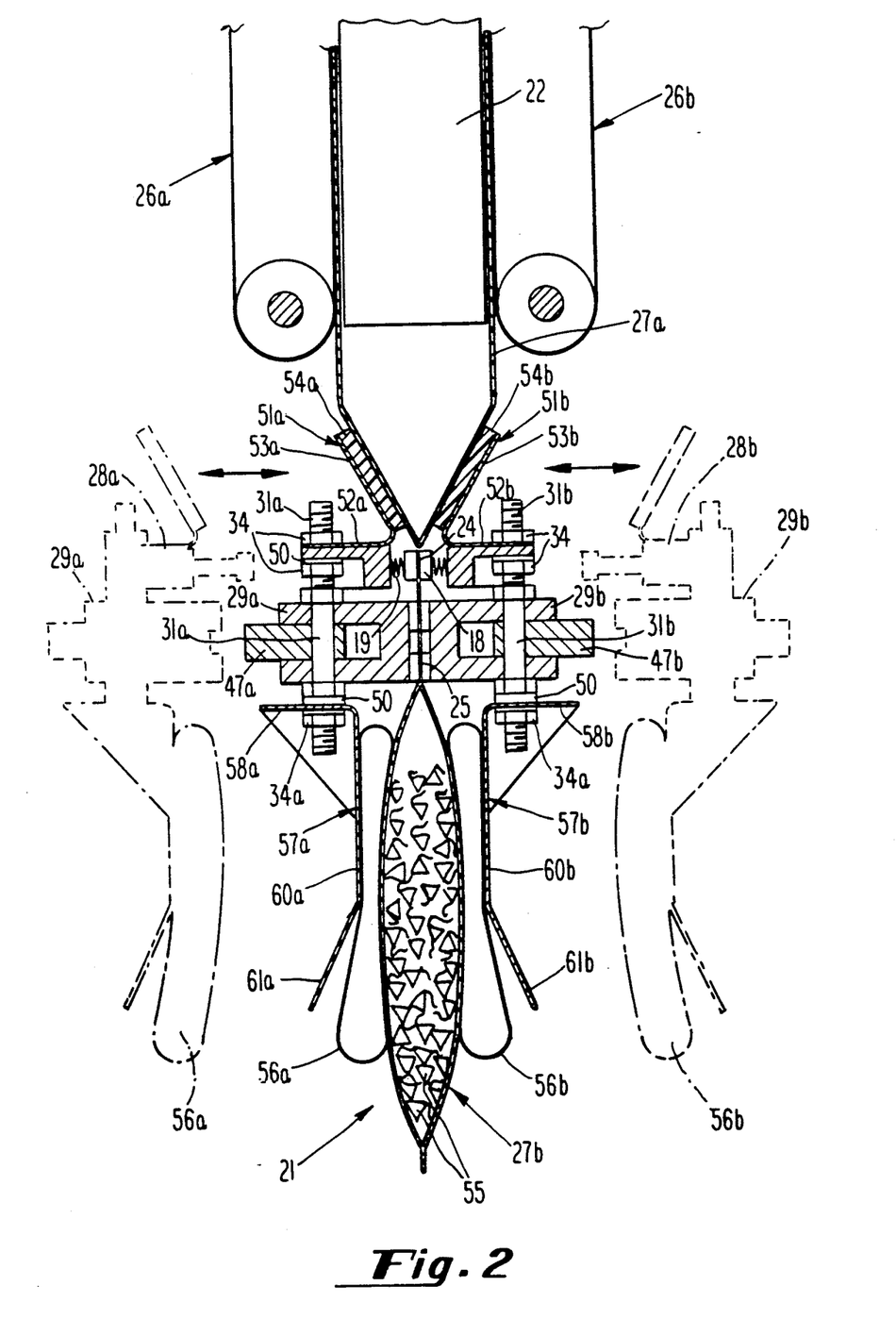
FIG. 2 shows an enlarged cross-sectional end view of the fluidic deflator apparatus in its engaged position, the receiving position of the same being shown in phantom.
Figure 3:
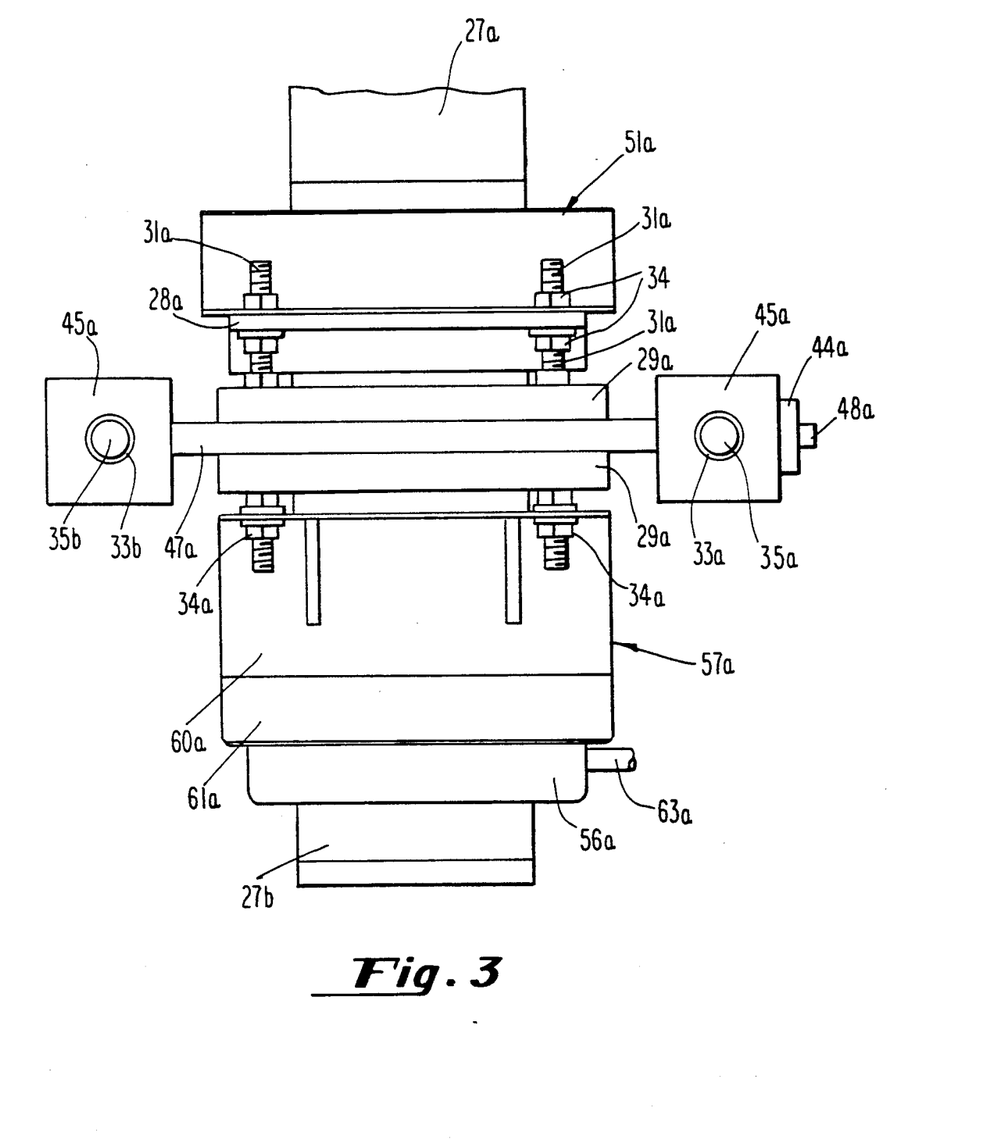
FIG. 3 is an enlarged side view of the apparatus shown in FIG. 1.

Each first sealing device 28a, 28b is carried by and connected to a respective second sealing device 29a, 29b by pairs of connecting rod members 31a, 31b, with one of the rod members in each pair (not shown) being located directly behind an associated member 31a, 31b in the views shown in FIGS. 1 and 2. FIG. 3 shows the pair of rod members 31a connecting the sealing devices 28a and 29a.

The connecting rods 31a and 31b are shown in FIGS. 2 and 3 having threaded end portions for accommodating retaining members, such as, for example, matingly threaded nuts, generally designated by the numeral 34.

The sealing devices 29a and 29b are mounted to respectively associated slide supporting bar members 47a and 47b. Bar members 47a and 47b are connected at opposite ends thereof to respectively associated slide members 45a and 45b. Each slide member 45a, 45b is provided with a bore extending transversely therethrough, each said bore being fitted with a bushing 33a, 33b. A pair of rail members 35a and 35b are supported on the packaging machine frame 36 by means not shown. The rail members 35a and 35b extend horizontally through respective bushings 33a, 33b (see FIG. 3) to permit sliding movement of said members 45a, 45b along the rails toward and away from one another. Although, the rails are shown extending through slide members 45a and 45b, it is understood that the rails may extend through other connected components, such as but not limited to, sealing devices 29a, 29b or 28a, 28b, or supporting bar members 47a, 47b (FIG. 2). Since members 29a, 29b, 28a, 28b and 56a, 56b are connected to respectively associated bar members 47a and 47b, these components will also be moved by the operation of the piston 42, toward and away from each other along with the slide members 45a, 45b.

Frame 36 is shown carrying a cam support portion 37 to which cam member 38 is pivotally mounted by a pivot pin 40. An air cylinder 41 is carried by the frame 36, which for example, operates a piston push/pull rod 42 which is pivotally connected to an arm 43 of cam member 38. Extending from the cam member 38 pivotally mounted levers 44a and 44b, each opposite lever end being pivotally connected to a respective slide member 45a, 45b by respectively associated pin means 48a, 48b. Operation of the piston 42 will turn the cam member 38, thereby providing reciprocating movement of levers 44a and 44b, which open and close opposing sealing devices 28a, 28b and 29a, 29b as the slide members 45a and 45b which are attached to the supporting bars 47a and 47b that carry the sealing devices slide along both rail members 35a and 35b. FIG. 2 shows the closed position of the sealing devices 28a, 28b, 29a, 29b in full line and the open position in phantom.

In FIG. 2 a pair of slide supporting bar members 47a, 47b are shown each being connected to a respective sealing device 29a, 29b by pairs of connecting rods 31a and 31b, respectively.

The connecting rods 31a and 31b extend through and beyond respective sealing devices 28a, 28b and 29a, 29b. A series of nuts 34, and washers generally designated by the numeral 50, are shown for attaching and providing vertically adjustable positioning of the sealing devices 28a, 28b and 29a, 29b. Groupings of nuts 34 and washers 50, other than the arrangement shown in FIG. 2 may be used to vary the vertical positions of sealing devices 28a and 28b relative to those 29a and 29b, thereby allowing control of the distance between the lower and upper package seals 24 and 25 respectively of successive bags.

A pair of adjustably positionable bracket members 51a, 51b are shown supported on respective first sealing devices 28a, 28b, by connecting rods 31a and 31b. Each bracket member 51a, 51b is provided comprising a horizontal lower portion 52a, 52b which rests on a sealing device 28a, 28b, and an angularly vertical portion 53a, 53b which support a resilient elastomeric pad 54a, 54b. The bracket members 51a, 51b are positioned for flattening the tubular package blank 27a and will engage the bag 27a when sealing devices 28a, 28b, 29a, 29b and bladders 56a, 56b are brought together in their full-line engaged position as shown in FIG. 2.

As described above in relation to the sealing device, the bracket members 51a, 51b are also adjustable, and can be vertically adjusted by the use of washers 50 and nuts 34. In addition, the horizontal positioning of the bracket members 51a, 51b is facilitated by providing a pair of generally "U"-shaped cut-outs or slots (not shown), in horizontal lower portions 52a, 52b, through which each pair of connecting bars 31a, 31b extends before receiving a nut 34 thereon to retain the brackets 51a, 51b and respective sealing means 28a, 28b together.

The connecting rods 31a, 31b extend beneath sealing devices 29a, 29b to support the fluidic package deflator mechanism 21.

The deflator mechanism 21 is shown comprising a pair of deflator bladder members 56a and 56b with supporting means, such as but not limited to, a pair of brackets 57a, 57b, said brackets 57a, 57b being attached to the sealing device assembly by respective pairs of connecting rods 31a and 31b which carry the brackets 57a, 57b. The brackets 57a, 57b may, for example, comprise inverted "L"-shaped configurations having connecting portions 58a, 58b, bladder pressing portions 60a, 60b extending vertically downward therefrom at right angles thereto, and flanged tail portions 61a, 61b which support the bottom of said bladder 56a, 56b when said bladder 56a, 56b engages the package 27b. Because product articles tend to accumulate at the bottom of the bag during filling, the flanged portions 61a, 61b provide additional space for the lower portions of bladders 57a, 57b to prevent crushing of the article upon engagement.

A pair of adjustment notches or grooves (not shown) is provided in each connecting portion 58a, 58b of said brackets 57a, 57b for enabling horizontal adjustment in the positioning of the bladder members 56a, 56b. The adjustment may be achieved by first loosening the retaining nuts 34a which are shown fastened to connecting rods 31a, 31b, then sliding the brackets 57a, 57b to the desired position, and then tightening the bolts 34a to secure the bladder members 56a, 56b in their desired positions. Such a feature is preferable due to the variety of package sizes, volumes and dimensions, as well as the nature of the product articles, which can be used with the bag making, filling and sealing machine 20.

Deflator bladder members 56a, 56b are shown carried on the brackets 57a, 57b, and may be mounted to said brackets with an adhesive compound of suitable nature for bonding metal (of which the brackets 57a, 57b are preferably comprised) to a rubber or polymer compound of which preferably the bladders 56a, 56b are comprised. Preferably, the bladder material will comprise a natural or synthetic rubber compound, or a polymeric compound. It is conceivable that other materials, in addition to those mentioned above, would also be suitable for comprising the deflator bladders 56a, 56b, provided such materials exhibit resiliency or are provided with a flexible portion thereof. Moreover, any suitable mechanical fasteners could be used for the brackets 57a, 57b to carry the bladders 56a, 56b.

The bladders 56a, 56b may also be provided with different thicknesses at different portions of the bladder. Therefore it is understood that the bladders may be tailored to suit a packaging application calling for different or non-uniform amounts of pressure to be applied to different areas of a single package, for example, where the articles or article is of a non-uniform shape.

The bladders 56a, 56b may comprise various durometric characteristics depending on the application, and when necessary may be changed and replaced with different bladders of suitable composition characteristics.

The bladders 56a, 56b are provided with attachment means (not shown) for receiving tube connecting members 63a, 63b which in turn are each connected to a respective length of tubing 64a, 64b. The opposite ends of tubing 64a, 64b are, in turn, connected to a fluid regulator mechanism generally designated as 65. The tubing 64a, 64b although shown schematically represented by dashed lines for convenience is understood to completely extend to the regulator mechanism 65. Various lengths of tubing 64a, 64b may be provided depending upon the location of the regulator mechanism 65. Usually the mechanism 65 may rest on the floor near the base of the packaging machine 20.

The fluid regulator mechanism 65 is used to control the pressure of the fluid contained throughout the bladder, tubing system and accumulator bladder 73 (hereinafter "system").

Fluid is introduced into the system through the fluid receiving duct 67. A pressure gauge 68 is also provided to indicate the system pressure when loading the system and during packaging operations, where the pressing of members 60a, 60b against bladders 56a, 56b, which in turn press against opposite sides of a filled bag 27b, causes the fluid to return from bladders 56a, 56b to bladder 73. The accumulator 66 acts as a sump, facilitating the compression of the bladders 56a, 56b upon their engagement with an article-containing package 27b by taking on the fluid which has been forced out of the bladders 56a, 56b. The fluid employed may comprise liquid or gaseous matters, however air provides suitable characteristics for operation.

Shown in FIG. 1 is an embodiment of the system comprising a manually operated bulb member 70 for loading the system with air under a desired pressure. The air is pumped into the system by the bulb 70 until a desired reading of gauge 68 is obtained. The valve screw 71 is therefore closed to seal off the system from the atmosphere. The amount of pressure loaded into the system may of course vary with the bladder 56a, 56b materials used as well as the firmness or bulk of the article to be packaged. While not shown, a pressure regulating valve system may be employed with the mechanism in order to provide a constant fluid system pressure in spite of changes in the atmospheric pressure. It is further understood that the bulb 70 could be replaced with an automatic pressure control system and retain operations consistent with the features of the invention which are described herein.

An accumulator 66 is shown comprising bladder 73 positioned between a pair of plate members 74 and 75. The ripper plate member 75 is provided with an aperture (not shown) through which a connecting tube 76 passes.

The deflator bladders 56a, 56b engage a product-containing bag 27b to force excess air out of the top portion of the bag 27b. Bladders 56a and 56b are shown in their fully inflated pre-engagement condition in the phantom view shown in FIG. 2. The full-line view of FIG. 2 shows the deflators in their compressed condition and engaging product-containing bag 27b.

The operation of the bagging machine 20 enables a continuous feeding of bags and filling with product articles. The fluidic deflators 56a, 56b operate in association with the serially continuous processing. Upon opening the sealing devices 28a, 28b, 29a, 29b to the phantom positions illustrated in FIG. 2, the deflators 56a, 56b are filled with fluid which passes from the accumulator 66. Due to the absence of any force or pressure on the deflators 56a, 56b, in the open position, the deflators are free to expand. Since the force of fluid pressure required to expand the deflator material is less than that required to support the upper weight plate 75, on accumulator bladder 73, as the deflators take up fluid, the accumulator bladder 73 will then deflate and upper plate 75 supported by the accumulator will be lowered.

It is noted that variables in the deflation process include the weight of the upper plate 75, the inner diameter of the system tubing 64a, 64b, and the materials used to comprise the bladders 56a, 56b, and accumulator bladder 73. Optionally, it has been observed that tubing of at least $\frac{1}{2}''$ diameter, and maintenance of a constant system pressure of 4 to 5 inches of water, with synthetic rubber bladders, sufficiently enabled air removal from the product bags.

Serially continuous bagging operation involves the receipt of a package 27b, between opposing sealing devices members 28a, 29a and 28b, 29b, and between opposing deflator members 56a, 56b when in their open position shown in phantom in FIG. 2. Product articles 55 then enter the hollow tube 22 through a hopper (not shown) which opens into the tube body. The hopper is preferably provided with flow-regulation means which is controlled by a mechanism (not shown) in order to dispense a desired amount of product 55 into the package 27b. The operation of the hopper mechanism is often controlled by a microprocessor circuit operating in association with the other components of the packaging machine, including those which control the fluidic deflator mechanism 21. Once product is delivered into the bag 27b, the cylinder 41 carrying piston 42 is immediately actuated by sensors of the like (not shown) to bring the sealing members 28a, 28b, 29a, 29b, and deflators 56a, 56b, into engagement with the package 27b. The deflators 56a, 56b are set and positioned to have a head start over the sealing devices 28a, 28b, 29a, 29b, and will engage the bag 27b to expel air from the bag being filled, up into the next waiting bag 27a immediately before any of the said sealing members meet. This is partly the result of deflator positioning, and partly due to there being expansion of the bag 27b from contained product 55 which occurs at the bladder contacting portion of the bag 27b. Therefore, once the sealing devices finally engage the bag, the excess air will have been already driven out of the package 27b. The sealing plates 18 backed by springs 19 then come together with the bottom seal zone 24 of a next bag therebetween, for suitable heat sealing closed a bag bottom, via heat sealers (such as by electrical heating) in members 28a, 28b and/or 18 thereof. Simultaneously along with members 28a, 28b, sealing members 29a, 29b are brought together to seal closed the top 25 of the just-filled bag, via heat sealers in members 29a, 29b. Two seals are thus formed, the lower seal 24 of the next successive empty bag 27a, and the upper seal 25 of the filled bag 27b. A severing mechanism, such as a cutter (not shown) may separate bags between the seals 24, 25, by operating at the same time that sealing devices 28a, 28b, 29a, 29b engage the packaging material. The process is repeated by reversing the piston action to open the sealing device and deflators and then pulling down the package 27a with conveyors 26a, 26b.

It will be noted that variations may be made consistent with the operation of this invention. For example, one of the pair of sealing members and deflator members may remain stationary, with only the opposing members being driven to engage the bag against the stationary members. Alternative to the cam and lever operation, it is understood that a variety of other driving mechanisms may be employed with equal success. For example a system of belts and pulleys, gears and chains, or other motor driven or mechanical drive systems could also work in connection with the present invention. These and other variations and changes in the form and detail of the device ma be made in accordance with the invention, which is to be broadly construed and to be defined by the scope of the claims appended hereto.

What is claimed is:

1. An apparatus for making, filling and sealing packages comprising:
   (a) means for making a package;
   (b) means for filling a package with content articles;
   (c) fluidic deflator means for expelling excess air from said filled package, said fluidic deflator means containing fluid therein and comprising means separating said fluid from the atmosphere; and
   (d) means for sealing said package.

2. The apparatus of claim 1, wherein said fluidic deflator means comprises fluid-containing bladder means, said bladder means comprising a container for retaining fluid therein.

3. The apparatus of claim 2, wherein said fluidic deflator means includes a fluid-filled bladder member having flexible wall construction.

4. The apparatus of claim 3, further comprising a fluid-containing reservoir means comprising a closed system whereby said bladder fluid is in communication with said reservoir fluid, said fluid being in free association with said deflator bladder and said reservoir.

5. The apparatus of claim 4, wherein said reservoir comprises a flexible bladder member.

6. The apparatus of claim 5, further comprising pressure regulator means for maintaining said fluid contained within said deflator and reservoir bladder at a constant pressure.

7. The apparatus of claim 6, further comprising driving means for moving said fluidic deflator means toward and away from one another.

8. The apparatus of claim 1, wherein said deflating means comprises liquid-containing means.

9. The apparatus of claim 1, wherein said deflating means comprises gas containing means.

10. An apparatus for making, filling and sealing packages comprising:
    (a) means for making a package including delivering means for longitudinally delivering tubular packaging material;
    (b) filling means for filling tubular packaging with articles;
    (c) at least one sealing device disposed below said delivering means, for transversely sealing said packaging material at successive longitudinally spaced apart intervals, said sealing device having transversely movable sealing means which are brought together to engage said packaging material and to heatingly fuse said packaging material together to form an end of at least one package; and
    (d) means for shaping and deflating article containing packages, including a pair of transversely spaced apart package pressing means each being carried for transverse movement with associated said sealing means, and a pair of transversely spaced apart bladder means each being disposed for pressed engagement by a said pressing means, each said bladder means being of flexible construction.

11. The apparatus claim 10, wherein said bladder means are fluid-containing.

12. The apparatus of claim 11, further comprising a drive means for moving said bladder means toward and away from one another.

13. The apparatus of claim 12, wherein said articles are dispensed into a package positioned between said bladder means, said bladder means being provided to engage the article-containing package when moved toward each other, thereby 14. The apparatus of claim 10 wherein said deflating means comprises gas containing means.

15. A method for making, filling and sealing packages comprising the steps of:
    (a) making a package;
    (b) filling a package with content articles;
    (c) expelling excess air from said filled package with fluidic deflator means; and
    (d) sealing said package;
    (e) wherein said fluidic deflator means contains fluid and wherein the step of expelling excess air from said package further includes exerting a pressure of contained fluid through a wall of said fluidic deflator means on the package.

16. The method of claim 15, wherein the step of expelling excess air from said filled packages further comprises engaging said article-containing package with fluid-filled bladder means.

17. The method of claim 16, including the step of compressing said bladder means against said article-containing package.

18. A method for making filling and sealing packages comprising:
    (a) longitudinally delivering tubular packaging material with delivering means to make a package;
    (b) filling tubular packages with articles;
    (c) transversely sealing said packaging material at successive longitudinally spaced apart intervals with sealing means, transversely moving said sealing means together to engage the packaging materials, and heatingly fusing the packaging material together, thereby providing an end of at least one package;
    (d) shaping and deflating article-containing packages with a pair of transversely spaced apart package pressing means by transversely moving the package pressing means along with sealing means and engaging a pair of transversely spaced apart flexibly constructed fluid filled bladder means with said pressing means; and
    (e) wherein said shaping and deflating includes the step of substantially simultaneously engaging said article-containing packages with said pair of fluid-filled bladder means.

19. The method of claim 18, further comprising the step of moving said package pressing means toward and away from one another by driving them toward and away from each other.

20. The method of claim 18, further comprising the step of positioning an article-containing package between the bladder means prior to expelling air from the package by engaging the package with the bladder means.

21. A method for making, filling and sealing packages comprising the steps of:
   (a) making a package;
   (b) filling a package with content articles;
   (c) expelling excess air from said filled package with fluidic deflator means;
   (d) sealing said package;
   (e) wherein the step of expelling excess air from said filled packages further comprises engaging said article-containing package with fluid-filled bladder means;
   (f) including the step of compressing said bladder means against said article-containing packages; and
   (g) including the step of regulating and maintaining a constant pressure of fluid within said bladder means.

22. The method of claim 21, including the step of transferring fluid from said bladder means to a reservoir having at least one flexible wall by compressing said bladder means.

23. The method of claim 22, including the step of expanding and contracting the flexible wall of said reservoir by transferring a volume of fluid from said bladder means to said reservoir and transferring a volume of fluid from said reservoir to said bladder means.

24. A method for making filling and sealing packages comprising:
   (a) longitudinally delivering tubular packaging material with delivering means to make a package;
   (b) filling tubular packages with articles;
   (c) transversely sealing said packaging material at successive longitudinally spaced apart intervals with sealing means, transversely moving said sealing means together to engage the packaging material, and heatingly fusing the packaging material together, thereby providing an end of at least one package;
   (d) shaping and deflating article-containing packages with a pair of transversely spaced apart package pressing means by transversely moving the package pressing means along with sealing means and engaging a pair of transversely spaced apart flexibly constructed fluid filled bladder means with said pressing means;
   (e) wherein said shaping and deflating includes the step of substantially simultaneously engaging said article-containing packages with said pair of fluid-filled bladder means;
   (f) further comprising the step of positioning an article-containing package between the bladder means prior to expelling air from the package by engaging the package with the bladder means; and
   (g) including the step of further regulating and maintaining a constant pressure of fluid within said bladder means.

25. The method of claim 24, including the step of transferring fluid said bladder means to a flexible walled reservoir by compressing said bladder means.

26. The method of claim 25, including the step of expanding and contracting the flexible wall of said reservoir by transferring a volume of fluid from said bladder means to said reservoir and transferring a volume of fluid from said reservoir to said bladder means.

27. An apparatus for making, filling and sealing packages comprising:

(a) means for making a package including delivering means for longitudinally delivering tubular packaging material;
(b) filling means for filling tubular packaging with articles;
(c) at least one sealing device disposed below said delivering means, for transversely sealing said packaging material at successive longitudinally spaced apart intervals, said sealing device having transversely movable sealing means which are brought together to engage said packaging material and to heatingly fuse said packaging material together thereby forming an end of at least one package;
(d) means for shaping and deflating article-containing packages, including a pair of transversely spaced apart package pressing means each being carried for transverse movement with associated said sealing means, and a pair of transversely spaced apart bladder means each being disposed for pressed engagement by a said pressing means, each said bladder means being of flexible construction;
(e) wherein said bladder means are fluid-containing; and
(f) wherein said shaping and deflating means further comprises a fluid-containing reservoir such that the fluid contained in said bladder is in communication with the reservoir fluid thereby forming a closed system, comprising means whereby upon said engagement of the article-containing packages with said bladder means at least a portion of said bladder fluid is forced into said reservoir, said reservoir being at least partially flexible and comprising means for accommodating the volume of fluid displaced from said bladder means upon engagement of the bladder means with said article-containing packages.

28. An apparatus for making, filling and sealing packages comprising:
(a) means for making a package including delivering means for longitudinally delivering tubular packaging material;
(b) filling means for filling tubular packaging with articles;
(c) at lest one sealing device disposed below said delivering means, for transversely sealing said packaging material at successive longitudinally spaced apart intervals, said sealing device having transversely movable sealing means which are brought together to engage said packaging material and to heatingly fuse said packaging material together, thereby forming an end of at least one package;
(d) means for shaping and deflating article-containing packages, including a pair of transversely spaced apart package pressing means each being carried for transverse movement with associated said sealing means, and a pair of transversely spaced apart bladder means each being disposed for pressed engagement by a said pressing means, each said bladder means being of flexible construction;
(e) wherein said bladder means are fluid-containing;
(f) wherein said shaping and deflating means further comprises a fluid-containing reservoir such that the fluid contained in said bladder is in communication with the reservoir fluid thereby forming a closed system, comprising means whereby upon said engagement of the article-containing packages with said bladder means at least a portion of said bladder fluid is forced into said reservoir, said reservoir being at least partially flexible and comprising means for accommodating the volume of fluid displaced from said bladder means upon engagement of the bladder means with said article-containing packages; and (g) wherein said deflating means comprises gas containing means.

29. An apparatus for making, filling and sealing packages comprising:
(a) means for making a package including delivering means for longitudinally delivering tubular packaging material;
(b) filling means for filling tubular packaging with articles;
(c) at least one sealing device disposed below said delivering means, for transversely sealing said packaging material at successive longitudinally spaced apart intervals, said sealing device having transversely movable sealing means which are brought together to engage said packaging material and to heatingly fuse said packaging material together, thereby forming an end of at least one package;
(d) means for shaping and deflating article-containing packages, including a pair of transversely spaced apart package pressing means each being carried for transverse movement with associated said sealing means, and a pair of transversely spaced apart bladder means each being disposed for pressed engagement by a said pressing means, each said bladder means being of flexible construction;
(e) wherein said bladder means are fluid-containing;
(f) wherein said shaping and deflating means further comprises a fluid-containing reservoir such that the fluid contained in said bladder is in communication with the reservoir fluid thereby forming a closed system, comprising means whereby upon said engagement of the article-containing packages with said bladder means at least a portion of said bladder fluid is forced into said reservoir, said reservoir being at lest partially flexible and comprising means for accommodating the volume of fluid displaced from said bladder means upon engagement of the bladder means with said article-containing packages; and
(g) wherein said deflating means comprises air-containing means.

30. An apparatus for making, filling and sealing packages comprising:
(a) means for making a package including delivering means for longitudinally delivering tubular packaging material;
(b) filling means for filling tubular packaging with articles;
(c) at least one sealing device disposed below said delivering means, for transversely sealing said packaging material at successive longitudinally spaced apart intervals, said sealing device having transversely movable sealing means which are brought together to engage said packaging material and to heatingly fuse said packaging material together to, thereby forming an end of at least one package;
(d) means for shaping and deflating article-containing packages, including a pair of transversely spaced apart package pressing means each being carried for transverse movement with associated said sealing means, and a pair of transversely spaced apart bladder means each being disposed for pressed engagement by a said pressing means, each said bladder means being of flexible construction;
(e) wherein said bladder means are fluid-containing; and
(f) wherein said shaping and deflating means further comprises a fluid-containing reservoir such that the fluid contained in said bladder is in communication with the reservoir fluid thereby forming a closed system, comprising means whereby upon said engagement of the article-containing packages with said bladder means at least a portion of said bladder fluid is forced into said reservoir, said reservoir being at least partially flexible and comprising means for accommodating the volume of fluid displaced from said bladder means upon engagement of the bladder means with said article-containing packages; and
(g) wherein said deflating means comprises liquid-containing means.

31. A method for making, filling and sealing packages comprising:
(a) longitudinally delivering tubular packaging material with delivering means to make a package;
(b) filling tubular packages with articles;
(c) transversely sealing said packaging material at successive longitudinally spaced apart intervals with sealing means, transversely moving said sealing means together to engage the packaging materials, and heatingly fusing the packaging material together, thereby providing an end of at least one package;
(d) shaping and deflating article-containing packages with a pair of transversely spaced apart package pressing means by transversely moving the package pressing means along with sealing means and engaging a pair of transversely spaced apart flexibly constructed bladder means with said pressing means;
(e) wherein said shaping and deflating includes the step of substantially simultaneously engaging a pair of fluid-filled bladder means;
(f) further comprising the steps of positioning an article-containing package between the bladder means, and expelling air from the package by engaging the package with the bladder means;
(g) including the step of further regulating and maintaining a constant pressure of fluid within said bladder means; and
(h) including the step of transferring fluid from said bladder means to a flexible walled reservoir by compressing said bladder means.

32. An apparatus for making, filling and sealing packages comprising:
(a) means for making a package including delivering means for longitudinally delivering tubular packaging material;
(b) filling means for filling tubular packaging with articles;
(c) at least one sealing device disposed below said delivering means, for transversely sealing said packaging material at successive longitudinally spaced apart intervals, said sealing device having transversely movable sealing means which are brought together to engage said packaging material and to heatingly fuse said packaging material together to form an end of at least one package;

(d) means for shaping and deflating article containing packages, including a pair of transversely spaced apart package pressing means each being carried for transverse movement with associated said sealing means, and a pair of transversely spaced apart bladder means each being disposed for pressed engagement by a said pressing means, each said bladder means being of flexible construction;

(e) wherein said bladder means are fluid-containing; and (f) wherein said shaping and deflating means further comprises a fluid-containing reservoir such that the fluid contained in said bladder is in communication with the reservoir fluid thereby forming a closed system, comprising means whereby upon said engagement of the article-containing packages with said bladder means at least a portion of said bladder fluid is forced into said reservoir, said reservoir being at least partially flexible and comprising means for accommodating the volume of fluid displaced from said bladder means upon engagement of the bladder means with said article-containing packages.

33. An apparatus for making, filling and sealing packages comprising:

(a) means for making a package including delivering means for longitudinally delivering tubular packaging material;

(b) filling means for filling tubular packaging with articles;

(c) at least one sealing device disposed below said delivering means, for transversely sealing said packaging material at successive longitudinally spaced apart intervals, said sealing device having transversely movable sealing means which are brought together to engage said packaging material and to heatingly fuse said packaging material together to form an end of at least one package;

(d) means for shaping and deflating article-containing packages, including a pair of transversely spaced apart package pressing means each being carried for transverse movement with associated said sealing means, and a pair of transversely spaced apart bladder means each being disposed for pressed engagement by a said pressing means, each said bladder means being of flexible construction; and (e) wherein said deflating means comprises liquid containing means.

* * * * *